United States Patent Office 3,434,766
Patented Mar. 25, 1969

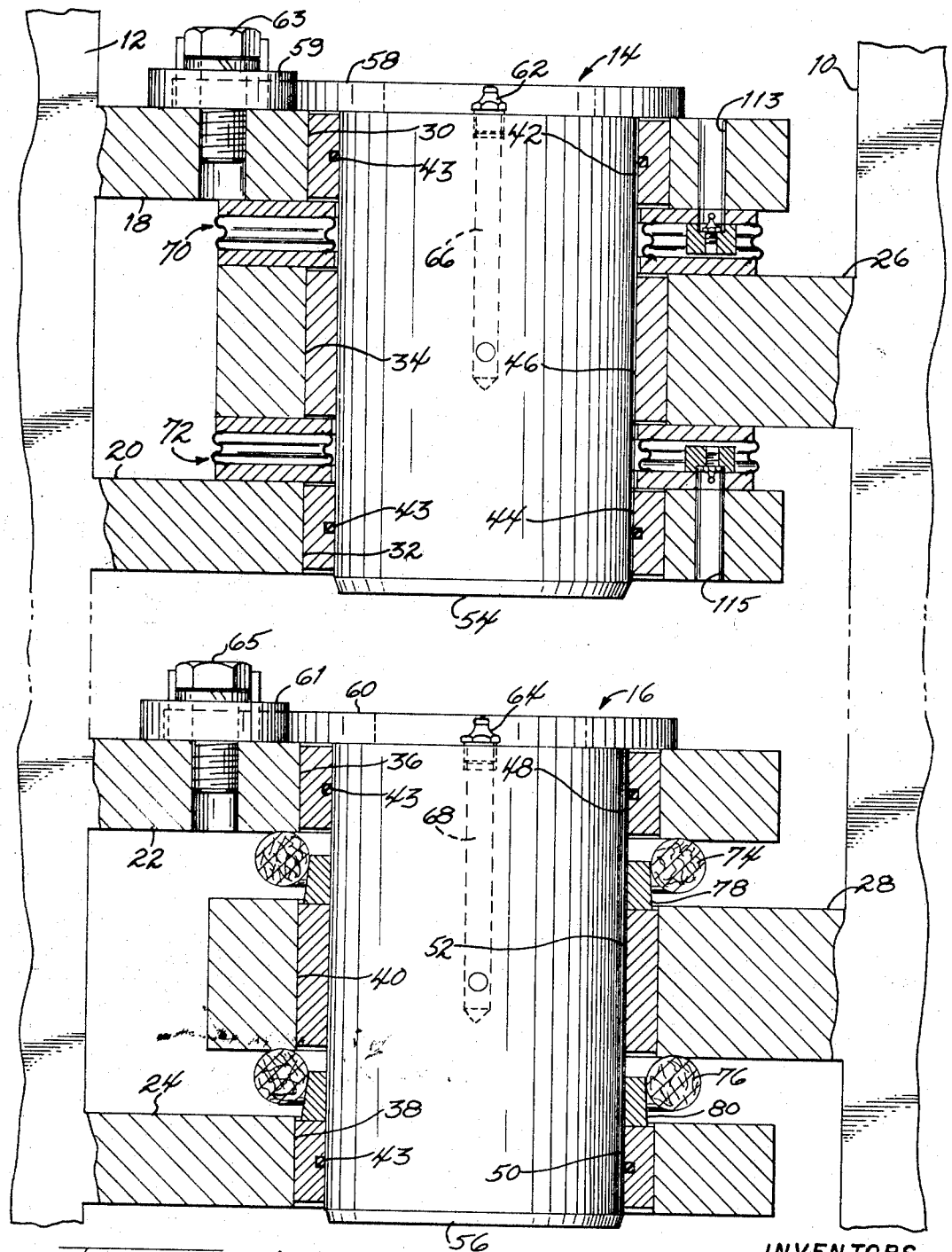

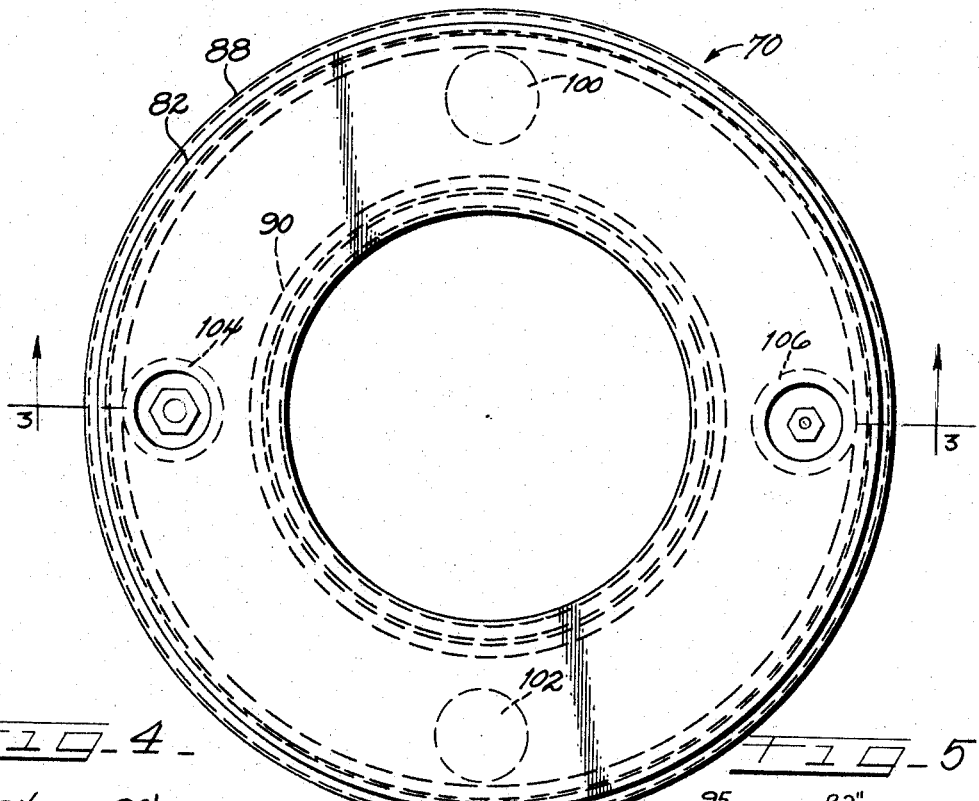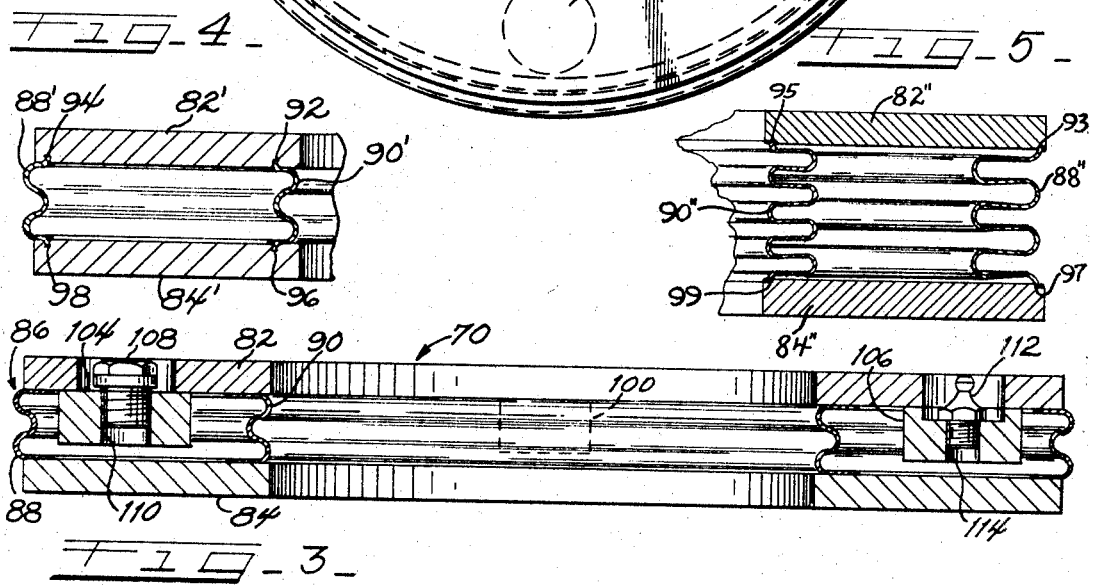

3,434,766
SELF-ALIGNING THRUST BUSHING ASSEMBLY
Keith W. Kampert, Libertyville, and Kenneth E. Houtz, Streamwood, Ill., assignors to International Harvester Company, Chicago, Ill., a corporation of Delaware
Filed July 1, 1966, Ser. No. 562,266
Int. Cl. F16c 23/00, 23/04, 25/04
U.S. Cl. 308—135                    5 Claims

ABSTRACT OF THE DISCLOSURE

A self-aligning bushing assembly for carrying axial loads between two relatively rotating plane surfaces secured for rotation by a pin extending through openings in the surfaces. An annular bearing member positioned adjacent one surface, a flexible annular member positioned between the bearing member and the other surface, and means for moving the surfaces toward each other to facilitate adjustment upon assembly and thereafter to compensate for wear.

---

This invention relates to a self-aligning bushing assembly adapted to carry thrust loads between two plane surfaces disposed in substantially parallel, spaced-apart relationship.

The thrust bushing assembly of this invention has general application as a load carrying member between two plane surfaces which are substantially parallel and adapted for relative rotation about an axis perpendicular to the surfaces. Examples of embodiments of this invention include the thrust bushings for the center hinge of an articulated vehicle, and for the bolster, or swivel support, for the rear axle of a vehicle. Among the problems encountered in these embodiments are: "dynamic misalignment" of the interconnected plane surfaces arising from fabrication errors, the requirement for the hinge or swivel to carry combined radial and axial loads of a large order, and the desirability of providing axial growth in the bushing assembly to adjust for wear and to facilitate assembly.

Accordingly, it is an object of the present invention to provide a thrust bushing assembly adapted to carry axial loads between two relatively rotating plane surfaces wherein the bushing assembly automatically compensates for misalignment between the surfaces and the bushing assembly.

Another important object is to provide a self-aligning thrust bushing assembly for mounting on the pin hinging two parallel surfaces together in which a flexible annular bellows structure containing a fluid is mounted between the surfaces.

Another object is to provide a self-aligning thrust bushing assembly incorporating a bellows structure pivotally supporting parallel bearing surfaces in which the bellows structure comprises radially spaced cylindrical members defining a sealed cavity containing a relatively incompressible fluid, and in which the cylindrical members have a corrugated configuration in vertical cross section to permit axial flexing.

Another object is to provide a self-aligning thrust bushing assembly for supporting two relatively rotating parallel surfaces in which the assembly is simple in construction, reliable in operation, provides automatic coplanar alignment of the surfaces relatives to the bushing, and may undergo selective axial growth to compensate for wear in the surfaces and to facilitate assembly.

Another object is to provide a self-aligning center pin thrust bushing assembly for use with an articulated frame vehicle in which an annular flexible bellows defining a cavity containing an incompressible fluid is provided between bearing members pivotally engaging support members on respective frame sections and in which means are provided to limit collapse of the bellows upon accidental loss of the fluid to prevent failure of the bushing assembly and/or permit emergency operation of related equipment.

These and other objects and advantages of the present invention will best be understood by reference to the following specification and accompanying drawings in which:

FIGURE 1 is a side elevation cross sectional view of the center hinge interconnecting the frame sections of an articulated vehicle incorporating a pin assembly having a pair of bushing assemblies embodying features of the present invention;

FIGURE 2 is an enlarged top plan view of one of the bushing assemblies of FIGURE 1;

FIGURE 3 is an enlarged side elevation cross sectional view of the bushing assembly taken along the line 3—3 of FIGURE 2;

FIGURE 4 is a side elevation cross sectional view illustrating a portion of a modified form of the bushing assembly of FIGURE 3;

FIGURE 5 is a side elevation cross sectional view illustrating a portion of another modified form of the bushing assembly of FIGURE 3;

Referring now to the drawings FIGURE 1 illustrates a preferred embodiment of the present invention in which the thrust bushing assemblies are mounted between the interleaved and substantially horizontal center hinge bearing surfaces on the frame sections 10 and 12 of an articulated vehicle. It is contemplated that the thrust bushing assemblies may be adapted for use with other embodiments in which parallel plane surfaces rotate about a pivot axis, such as the rear axle swivel support for a vehicle. Under these conditions the axis would be horizontal, as compared to the vertical alignment of the axis of the center pin embodiment.

The articulated vehicle comprises front frame section 10 and rear frame section 12 pivotally interconnected by means of a center hinge comprising axially aligned vertically spaced upper pin assembly 14 and lower pin assembly 16. For purposes of clarity, the pin assemblies are illustrated closer together than would be the case in an actual embodiment.

Each pin assembly pivotally interconnects the frame sections through supports secured to the frame sections. Thus, the supports secured to the rear frame section 12 comprise an upper clevis including a pair of vertically spaced arms 18 and 20 and a lower clevis including a pair of vertically spaced arms 22 and 24. The supports on the front frame section 10 comprise an upper tongue member 26 interleaved with the arms of the upper clevis and a lower tongue member 28 interleaved with the arms of the lower clevis.

A pair of aligned bores 30 and 32 are formed in the arms 18 and 20 in registry with a bore 34 formed in the upper tongue member 26. Similarly, a pair of aligned bores 36 and 38 are formed in the lower arms 22 and 24 in registry with a bore 40 formed in the lower tongue member 28. In the upper pin assembly a pair of sleeve bearings 42 and 44 are positioned in respective bores 30 and 32. A sleeve bearing 46 with dimensions having a relatively low $l/d$ (axial length to diameter) ratio is secured within the bore 34 of the tongue member 26. This low $l/d$ ratio minimizes the effects of any misalignment of the axes of the bores. A corresponding pair of sleeve bearings 48 and 50 are provided in respective bores 36 and 38 of the lower pin assembly while a sleeve bearing 52, also having a low $l/d$ ratio, is provided in the bore 40 of the lower tongue member 28. O-ring seals 43 are positioned within internal grooves formed in each of the sleeve bearings.

Upper pin member 54 and lower pin member 56 are mounted in the upper and lower sleeve bearings to interconnect the respective clevis and tongue members. A pair of flange members 58 and 60 are secured to respective pin members 54 and 56 by suitable means such as welding. A pair of cams 59 and 61 are secured to arms 18 and 22 by means of bolts 63 and 65 and functions to lock the flange and pin members in position. Grease fittings 62 and 64 connected with passageways 66 and 68 are provided in respective pins 54 and 56 to afford lubrication for the pin assemblies. An alternate means of lubrication may be provided by forming radially drilled holes (not shown) in tongue members 26 and 28, which holes communicate with the bores of bearings 46 and 52, respectively.

The upper pin assembly 14 carries radial loads between the frame sections through the sleeve bearings. In addition, the pin assembly 14 carries axial loads through a pair of self-aligning thrust bushing assemblies 70 and 72. The upper bushing assembly 70 provides a bearing surface for pivoting of the upper surface of the tongue member 26 relative to the lower surface of arm 18 about the pin 54. Similarly, the lower bushing assembly 72 provides a bearing surface for pivoting of the lower surface of tongue member 26 relative to the upper surface of arm 20. As will presently be explained in greater detail each of the bushing assemblies provides a flexible support between the tongue member and a corresponding clevis arm with a self-aligning feature whereby the horizontal bearing surfaces remain in coplanar alignment throughout pivoting of the frame sections about the pivot axis.

While the upper pin assembly 14 carries both radial and axial loads the lower pin assembly 16 is designed to carry only radial loads by means of the sleeve bearings 48, 52 and 50. A pair of cord ring seals 74 and 76 are mounted around the lower pin 56 to keep out dirt and water. A pair of annular seal adapters 78 and 80 are mounted on the pin 56 to position the seals in place on the pin assembly.

Referring to FIGURES 2 and 3 the upper thrust bushing assembly 70 is shown in greater detail. It is understood that the lower bushing assembly 72 is identical in construction to, but inverted from, the assembly 70.

The bushing assembly 70 comprises a pair of annular bearing members 82 and 84 axially spaced apart and connected by flexible means adapted to carry thrust loads. In a preferred embodiment of this invention the flexible means comprises an annular bellows 86 defining a sealed cavity enclosing a fluid. Where an incompressible fluid such as oil is used for filling the cavity then under vertical thrust loads the fluid, because it is confined, will develop hydrostatic pressure preventing collapse of the bellows. Under these conditions the bushing assembly bearing surfaces are free to tilt due to the flexible construction of the bellows, but the fluid will prevent any overall axial collapse or deflection. It is also contemplated that a gas may be added to the cavity to provide any desired elasticity in the housing assembly. The amount of axial deflection of the assembly would depend on the compressibility of the fluid (liquid and/or gas) provided in the cavity.

A condition known as "dynamic misalignment" occurs where the clevis and tongue members are skewed due to fabrication errors. This results in scoring and uneven wear during relative pivotal movement between the bearing surfaces. The flexible bellows 86 compensates for this condition and permits either of the bearing members 82 and 84 to remain in coplanar alignment with the corresponding lower surface of arm 18 and the upper surface of the tongue 26. This affords a plane surface contact which distributes the thrust load evenly across the bearing surfaces.

The flexibility of the bellows is afforded by providing a pair of concentric, radially spaced metallic cylindrical members 88 and 90 which provide sufficient strength against bursting. Each of the cylindrical members is formed with a corrugated configuration in vertical cross-section to permit flexing in an axial direction. It is understood that the number of convolutions provided in each cylindrical member will be determined by design considerations such as the internal fluid pressure in the bellows, the required misalignment angularity of a particular embodiment, and the amount of axial growth desired. In the construction illustrated in FIGURE 3 each cylindrical member is secured by brazing its edges to the surface of a corresponding bearing member to form a sealed cavity.

FIGURE 4 illustrates a modification of the invention of FIGURE 3 in which another means is provided for securing the cylindrical members 88′ and 90′ between the bearing members. In this modification a pair of concentric grooves 92 and 94 are formed in the lower surface of bearing member 82′ and a similar pair of grooves 96 and 98 are formed in the upper surface of bearing member 84′. The projecting edges of each of the cylindrical members are fitted into the corresponding grooves and secured thereto by suitable means such as brazing.

FIGURE 5 illustrates another modification in which the number of convolutions of cylindrical members 88″ and 90″ are increased and their profile is flattened to afford additional flexibilty and permit increased axial displacement or growth. The edges of each cylindrical member are fitted and brazed into grooves 93 and 95 formed in bearing member 82″ and grooves 97 and 99 formed in bearing member 84″.

With the fluid sealed in the cavity the bellows structure is capable of carrying a large axial thrust load without collapsing. As a precaution in the case of accidental fluid leakage from the bellows one or more stop members may be provided to prevent collapse and insure against damage to the bushing assembly. In the embodiment illustrated the stop members comprise a plurality of steel pads and inserts secured to the bearing members within the cavity. FIGURES 2 and 3 illustrate a pair of diametrically opposed steel pads 100 and 102 secured at one end to the lower surface of bearing member 82 and spaced at their other end from the upper surface of bearing member 84. Also, a pair of steel inserts 104 and 106 are each secured at one end to the lower surface of bearing member 82 and spaced at their other end from the upper surface of bearing member 84. Where fluid is accidentally discharged from the cavity in an amount which results in axial deflection of the bearing members the steel pads and steel inserts will move into contact with the bearing member 84. It is also contemplated that a single stop member 100 may be provided within the cavity instead of the plurality of members illustrated.

A pressure relief valve 108 may also be fitted within a bore 110 formed in the steel insert 104. The valve 108 functions to prevent bursting of the cylindrical members by relieving high pressure which may accidentally occur, for example, during fluid injection into the cavity.

A grease fitting 112 may be provided within a bore 114 formed in the steel insert 106. The fitting 112 permits injection of a fluid such as grease into the cavity to afford axial growth of the bellows structure. The requirement for such axial growth would be twofold: during assembly of the center pin assembly it is desirable to extend the thickness of the bushing assembly to take up the initial clearance provided between the bushing and supports; also, selective axial growth of the bushing assembly will compensate for any wear of the bearing members occurring during operation of the vehicle.

In preparation for assembly each bushing assembly is filled with the desired fluid, such as oil. Its thickness will then be less than the axial distance between the tongue and clevis arm in order to facilitate assembly. The assemblies are then positioned between the tongue and a corresponding arm of the clevis. Next, the upper pin member 54 is inserted in the sleeve bearings and secured to the upper arm 18 by means of the locking cam 59 engaging the flange member 58. Additional fluid, such as grease, may now be injected into the cavity of either of the bushing assemmblies through the grease fittings 112. Access to the grease fittings may be provided through a pair of bores 113 and 115 (FIGURE 1) formed in the arms. As the additional fluid is injected the bushing assembly will expand and take up the initial clearance. Each bushing assembly will now be in pivotal surface contact with the corresponding tongue and arms of the clevis.

In view of the foregoing description, it is clear that applicants have provided herein a new and improved bushing assembly to carry axial loads between two relatively rotating supports while obviating the requirement for thrust loaded spherical bearings and minimizing the effects of dynamic misalignment. Additionally there has been provided a reliable and efficient self-aligning thrust bushing assembly which is easily assembled, provides effective sealing for the bearing members, and which can be axially expanded to compensate for bearing wear.

While the embodiments herein are at present considered to be preferred, it will be understood that numerous variations and modifications may be made by those skilled in the art, and it is intended to cover in the appended claims all such variations and modifications as fall within the true spirit and scope of the invention.

What is claimed is:

1. A self-aligning thrust bushing assembly to carry axial loads between first and second substantially parallel supports, hinged for pivotal movement about an axis, the assembly including the combination of: a bearing member concentric with the axis and positioned intermediate the supports, the bearing member having a first surface pivotally engaged in coplanar alignment with the first support; an annular bellows structure having wall members defining a sealed cavity; a predetermined volume of fluid within the cavity; adjustment means for moving said first surface toward the first support to compensate for wear in the bearing member and the first support; and, other means limiting axial retraction of the bearing member with respect to the second support member to provide collapse of the bellows structure upon loss of fluid from the cavity.

2. The invention according to claim 1 wherein the other means comprises: at least one stop member secured to the second support, the stop member having an end projecting into the cavity, said end initially spaced a predetermined distance from the bearing member.

3. The invention according to claim 1 and further including; valve means in the bellows structure to relieve fluid therefrom above a predetermined pressure.

4. A self-aligning thrust bushing assembly to carry axial loads between first and second substantially parallel supports hinged for pivotal movement about an axis, the assembly including the combination of: a first bearing member concentric with the axis and positioned intermediate the supports, the bearing member having a first surface pivotally engaged in coplanar alignment with the first support; a second bearing member concentric with the axis and vertically spaced from said first bearing member, the second bearing member having a second surface pivotally engaged in coplanar alignment with the second support; an annular bellows structure having wall members defining a sealed cavity; and, a predetermined volume line of fluid within the cavity.

5. A self-aligning thrust bushing assembly to carry axial loads between a clevis and a tongue hinged for pivotal movement about an axis, the assembly including the combination of: a pair of bearing assemblies concentric with the axis and positioned with one assembly on either side of the tongue and between the tongue and the clevis, each of said bearing assemblies having a pair of bearing members having a first surface pivotally engaged in coplanar alignment with the tongue and a second surface in coplanar alignment with the clevis; each of said bearing assemblies having an annular bellows structure with wall members defining a sealed cavity connected between said bearing members, and additional means to selectively introduce fluid into each of the cavities for effecting axial extension of each bearing assembly.

References Cited

UNITED STATES PATENTS

| 75,115 | 3/1868 | Bennett | 308—137 |
| 3,133,743 | 5/1964 | Mullin | 308—163 |
| 1,232,800 | 7/1917 | Hess | 308—160 |
| 2,636,790 | 4/1953 | McNally | 308—160 |
| 3,299,981 | 1/1967 | Garrett | 180—51 |
| 3,167,147 | 1/1965 | Symons et al. | 180—51 |

FOREIGN PATENTS

| 418,073 | 10/1934 | Great Britain. |
| 855,829 | 12/1960 | Great Britain. |
| 962,602 | 12/1949 | France. |

MARTIN P. SCHWADRON, *Primary Examiner.*

FRANK SUSKO, *Assistant Examiner.*

U.S. Cl. X.R.

308—160, 165